INVENTORS.
RAYMOND J. KEARNS
JOSEPH J. ROLFE
BY
George C. Sullivan
Agent

April 9, 1963   R. J. KEARNS ETAL   3,085,190
STATIC INVERTER
Filed July 18, 1960   2 Sheets-Sheet 2
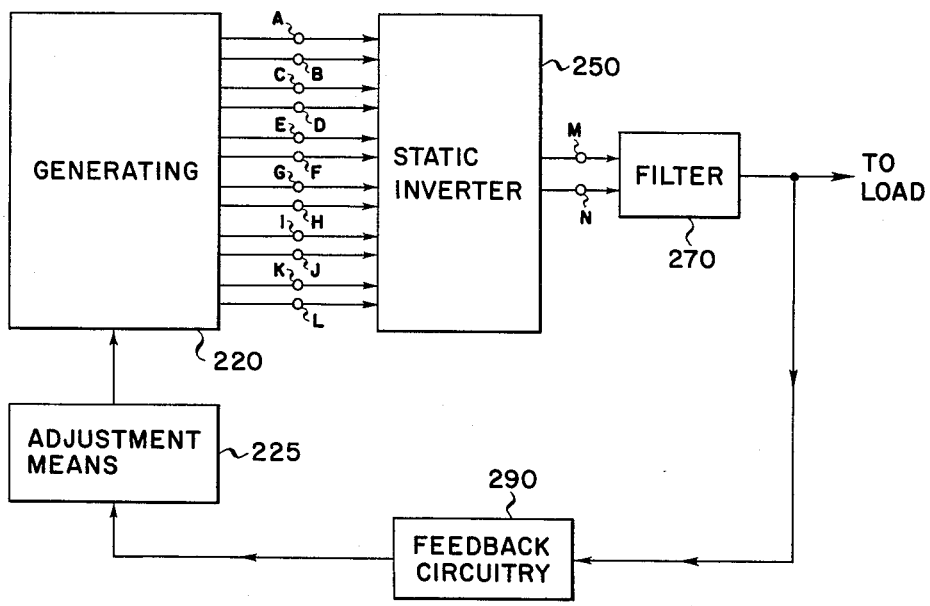
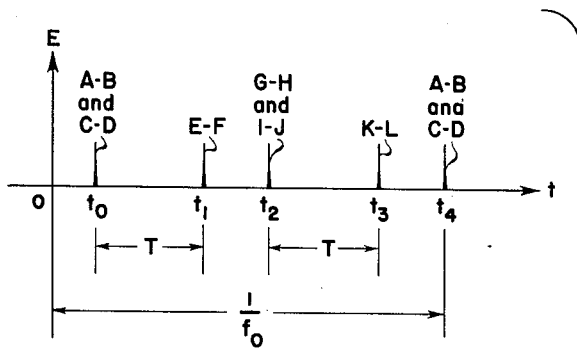
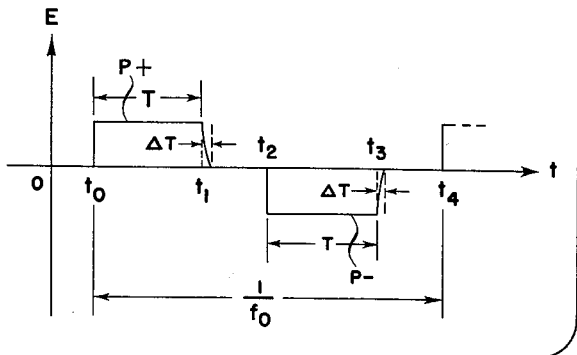
Fig. 3
INVENTORS.
RAYMOND J. KEARNS
JOSEPH J. ROLFE
BY
George C. Sullivan
Agent

United States Patent Office 3,085,190
Patented Apr. 9, 1963

3,085,190
STATIC INVERTER
Raymond J. Kearns, Mount View, and Joseph J. Rolfe, Palo Alto, Calif., assignors to Lockheed Aircraft Corporation, Burbank, Calif.
Filed July 18, 1960, Ser. No. 43,663
7 Claims. (Cl. 321—45)

This invention relates generally to means and methods for converting direct-current to alternating-current, and more particularly to a highly efficient, reliable and relatively simple static inverter for converting direct-current to alternating-current at high power levels.

In many applications it is necessary to convert direct-current to alternating-current at high power levels. For example, it is often necessary on planes, ships as well as on missiles and satellites to have available relatively high power alternating-current of predetermined frequency in order to operate various types of motors and instruments. In the past, alternating-current at high power was obtained by various mechanical means such as the use of motor-generator units and the like, but these have been found much too bulky, expensive and unreliable. In order to eliminate undesirable mechanical motion between component parts, various static inverters (that is, inverters requiring no mechanical motion) have been developed, first using vacuum tubes or thyratrons, and more recently using semiconductors, these electronic elements being arranged in oscillation or suitable switching arrangements to convert direct-current to alternating current. However, these known static inverters, although superior to previous mechanical arrangements, are still not adequate for many applications. For the most part these known static inverters are unreliable, particularly over extended operating periods, and involve considerable circuit complexity. Also, the efficiency of conversion has been far below what would be desirable in many applications.

Accordingly, it is the broad object of the present invention to provide an improved type of static inverter.

A more specific object of this invention is to provide a static inverter employing semiconductor switching elements in a relatively simple circuit arrangement which achieves a high efficiency of conversion and a high reliability of operation.

Another object of this invention is to provide a static inverter in accordance with the aforementioned object whose output power may be conveniently and efficiently regulated at low power levels.

A further object of this invention is to provide a static inverter in accordance with the aforementioned objects which can be successfully and reliably operated over a wide range of load conditions.

In a typical embodiment of the present invention, the above objects are accomplished by means of a static inverter employing silicon controlled rectifiers in a relatively simple circuit arrangement which overcomes the disadvantages of presently known static inverters. An important feature of this embodiment is the use of a single turn-off capacitor which is employed and arranged in co-operation with the silicon controlled rectifiers so that reliable turn-off is achieved without wasting the turn-off power. The specific nature of the invention as well as other advantages, uses and objects thereof, will clearly appear from the following description and the accompanying drawings in which:

FIG. 2 is a block diagram illustrating how the static inverter of FIG. 1 is incorporated in an overall system.

FIG. 3 shows two graphs which are used in describing the operation of the embodiment of FIG. 1.

Figure 1:
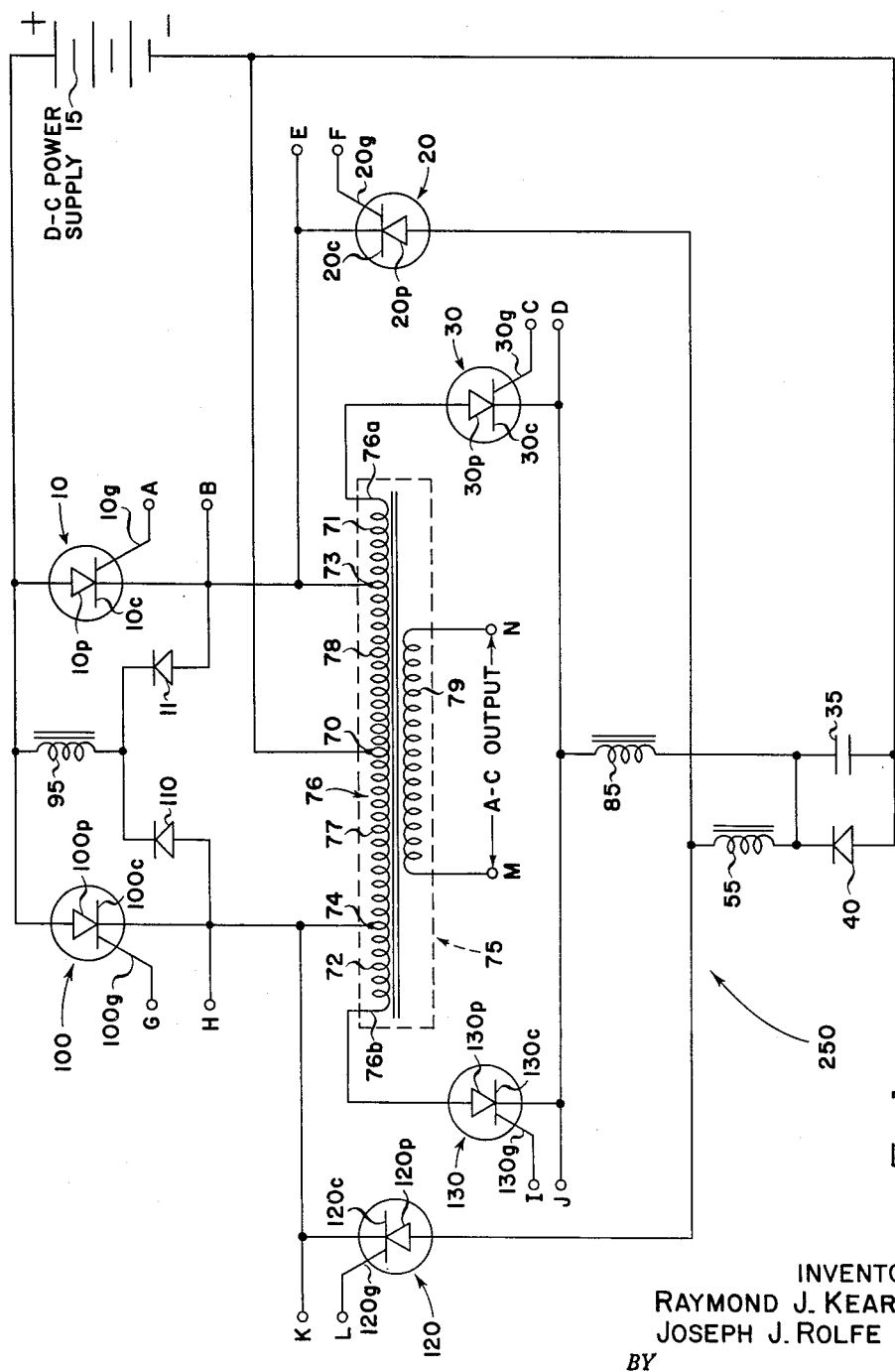
FIG. 1 is a circuit diagram of an embodiment of a basic static inverter in accordance with the invention.

In FIG. 1 a basic static inverter 250 in accordance with the invention is shown employing silicon controlled rectifiers 10, 20, 30, 100, 120 and 130. These silicon controlled rectifiers are preferably of the type recently made available by the General Electric Company, namely the GE C35. Such silicon controlled rectifiers are similar in operation to that of a conventional thyratron; that is, each silicon controlled rectifier has the usual plate and cathode elements (designated by the letters $p$ and $c$ following the rectifier designation in FIG. 1) and a third element (designated by the letter $g$ following the rectifier designation in FIG. 1) which is comparable to the grid of a thyratron.

As with a thyratron, conduction is achieved in the silicon controlled rectifier by exceeding some critical plate-to-cathode voltage or by applying power to the grid in the presence of a positive plate voltage. In a thyratron the firing power is ordinarily applied as a positive grid-to-cathode voltage, but in the silicon controlled rectifier it is applied as a positive grid-to-cathode current, since the firing mechanism of the rectifier is dependent on current rather than voltage. Also, because the grid-to-cathode voltage-current characteristic of the rectifier is essentially that of a forward-biased semiconductor diode, the voltage drop across the grid-to-cathode for the critical value of firing current is about 1 to 2 volts. Further details regarding silicon controlled rectifiers can be found in the article "Solid-State Thyratron Switches Kilowatts," by R. P. Frenzel and F. W. Gutzwiller, Electronics, Engineering Edition, March 28, 1958, page 52.

The terminals A—B, C—D, E—F, G—H, K—L and I—J in the circuit of FIG. 1 are respectively connected to the input terminals of the grids and cathodes of the silicon controlled rectifiers 10, 20, 30, 100, 120 and 130 as shown, and it is by applying power to the particular grid-to-cathode elements of a silicon controlled rectifier that triggering of the rectifier is accomplished.

The plates $10_p$ and $100_p$ of the silicon controlled rectifiers 10 and 100, respectively, are connected to the positive terminal of a D.-C. power supply 15 which may be a bank of storage batteries. This D.-C. power supply 15 serves as the direct-current power which is to be converted into alternating-current power of predetermined frequency in accordance with the invention. The negative terminal of the D.-C. power supply 15 is connected to the center tap 70 of the primary winding 76 of a transformer 75 which may be a low loss tape core transformer of conventional design. The cathodes $10_c$ and $100_c$ of the rectifiers 10 and 100, respectively, are connected to symmetrically located taps 73 and 74 of the primary winding 76 on opposite sides of the center tap 70.

Semiconductor diodes 11 and 110 are connected in parallel with the rectifiers 10 and 100, respectively, through an inductor 95, the diodes 11 and 110 being poled opposite to the rectifiers 10 and 100.

Also connected to the taps 73 and 74 are the cathodes $20_c$ and $120_c$ of the silicon controlled rectifiers 20 and 120, respectively. The plates $20_b$ and $120_b$ of these rectifiers 20 and 120 are connected together and to a turn-off capacitor 35 through an inductor 55. The remote end of the turn-off capacitor 35 is connected to the junction of the negative terminal of the D.-C. power supply 15 and the center tap 70 of the transformer primary winding 76. A semiconductor diode 40 is connected in parallel with the turn-off capacitor 35 and poled so as to prevent the capacitor 35 from being charged to a negative voltage.

Connected to the opposite ends 76a and 76b of the primary winding 76 of the transformer 75 are the plates $30_p$ and $130_p$ of the silicon controlled rectifiers 30 and 130, respectively. The cathodes $30_c$ and $130_c$ of these rectifiers 30 and 130 are connected to the turn-off capacitor 35 through an inductor 85.

FIG. 2 is a block diagram showing how the basic static inverter 250 of FIG. 1 may be incorporated in an overall system. As shown in FIG. 2, pulse generating circuitry 220 of conventional form is connected to the grid-to-cathode terminals A—B, C—D, E—F, G—H, I—J and K—L of the silicon controlled rectifiers of FIG. 1. The pulse generating circuitry 220 in cooperation with an adjustment means 225 is adapted to generate pulses having the required time relationships for successful operation of the static inverter 250, as will hereinafter be described. The output of the static inverter 250 appears across the output terminals M—N of the secondary winding 79 of the transformer 75 of FIG. 1 and is fed to a filter 270 for the purpose of removing distortion in the static inverter output waveform so as to provide a sine wave of relatively low distortion for feeding to a suitable load. The filter 270 is designed to be resistive at the desired A.-C. output frequency, capacitive below this frequency and inductive above. Such filters may readily be provided by those skilled in the art. Feedback circuitry 290 is provide between the output of the filter 270 and the adjustment means 225 to provide regulation at low power levels in a manner which will hereinafter become evident.

The operation of the embodiment of the invention shown in FIGS. 1 and 2 will now be described, making use of the graphs of FIG. 3 which illustrate a typical cycle of operation of the static inverter 250 of FIG. 1. From this description those skilled in the art will have no difficulty in providing the pulse generating circuitry 220 in FIG. 2 and in choosing the proper static inverter circuit values for the inductors 55, 85 and 95, the turn-off capacitor 35 and the transformer 75 in FIG. 1.

Initially it will be assumed that all silicon controlled rectifiers are in the "off" condition. At an arbitrary time $t_0$ firing pulses from the pulse generating circuitry 220 are applied to the grid and cathode terminals A—B and C—D to simultaneously turn on the silicon controlled rectifiers 10 and 30. These firing pulses are illustrated by the single pulse at $t_0$ in the top graph of FIG. 3. When the silicon controlled rectifier 10 turns "on" it becomes effectively a short circuit, causing the voltage of the D.-C. power supply 15 to be applied to the winding portion 78 of the transformer primary winding 76 as a result of positive current from the D.-C. power supply 15 flowing through the rectifier 10 and the winding portion 78. A positive output pulse P+ is thus produced across the terminals M and N of the secondary winding 79, as illustrated in the lower graph of FIG. 3.

At the same time, the simultaneous turn-on and effective shorting of the silicon controlled rectifier 30 causes the voltage appearing between the end 76a of the primary winding 76 and the center tap 70 to be applied to positively charge the turn-off capacitor 35 as a result of positive current flow through the controlled rectifier 30 and the inductor 85 to the turn-off capacitor 35. It will be understood that the voltage appearing at the end 76a is greater than the D.-C. power supply voltage applied between the tap 73 and the center tap 70 by the additional voltage induced in the winding portion 71 of the primary winding 76, thereby permitting the capacitor 35 to be charged by a source whose voltage may be made considerably larger than the voltage of the D.-C. power supply 15 alone. Also, to increase the positive voltage to which the turn-off capacitor 35 is charged and to provide high efficiency charging, the values of the turn-off capacitor 35 and the inductor 85 are chosen so that the capacitor 35 is charged by resonant charging. Consequently, as a result of providing the additional winding 71 to permit a higher source voltage to charge the turn-off capacitor 35, and the choice of the values of the capacitor 35 and the inductor 85 to provide resonant charging, the turn-off capacitor 35 is efficiently charged up to an appreciably greater voltage than that of the D.-C. power supply which may typically be 2.5E, where E is the voltage of the D.-C. power supply 15.

The turn-off capacitor charging time is made sufficiently small so that the turn-off capacitor charges up to its final voltage very rapidly as compared to the period of the desired A.-C. output frequency of the inverter. This condition will normally be met for any reasonable choice of the inductor 85 and turn-off capacitor 35, so that no special choice of the inductor 85 or capacitor 35 will be necessary. Shortly after the time $t_0$, therefore, the turn-off capacitor 35 will have been charged to its high voltage and the silicon controlled rectifier 30 will have been turned "off" because of lack of a sufficient holding current when charging current flow ceases. Also, the negative kick inherently present during resonant charging insures turn-off of the rectifier 30.

Although the rectifier 30 turns "off," the rectifier 10 remains conducting so as to apply the voltage of the D.-C. power supply 15 across the winding portion 78 of the transformer primary winding 76 to produce the positive output pulse until at a time $t_1$ a firing pulse from the pulse generating circuitry 220 is applied to the grid cathode terminals E—F of the silicon controlled rectifier 20, as shown in the top graph of FIG. 3. When the silicon controlled rectifier 20 turns "on" and becomes an effective short circuit at time $t_1$, it will be seen that the high positive voltage to which the turn-off capacitor 35 has been charged is placed in series opposition to the D.-C. power supply 15 as far as the rectifier 10 is concerned.

Since the voltage to which the capacitor 35 has been charged is appreciably greater than the voltage of the D.-C. power supply 15, it will be understood that the plate $10_p$ will be negative with respect to its cathode $10_c$, thereby turning "off" the rectifier 10. The inductor 55 is provided to limit the initial inrush of turn-off current from the turn-off capacitor 35 in order to prevent exceeding the maximum current requirements of the silicon controlled rectifier 20. When the silicon controlled rectifier 10 turns "off," the positive output voltage pulse P+ rapidly decays to zero as shown at $t_1$ in the lower graph of FIG. 3. It will be evident, therefore, that the width of the pulse T is essentially determined by the time period between the initial firing pulse at $t_0$ which simultaneously turns "on" the rectifiers 10 and 20 and the firing pulse at $t_1$ which turns "on" the rectifier 20.

The use of the additional winding portion 71 on the transformer 75 so as to permit a charging voltage source for the turn-off capacitor 35 of appreciably greater magnitude than that of the supply 15, and the use of resonant charging combine to insure that the turn-off capacitor 35 can be charged to a sufficiently high voltage to reliably turn off the rectifier 10.

An important feature of the circuit of FIG. 1 is that once the rectifier 10 is turned off, the energy on the turn-off capacitor 35 is not wasted, since the energy on the capacitor 35 now flows through the inductor 55, the silicon controlled rectifier 20 and the winding portion 78 of the primary winding 76 of the transformer 75 to feed the capacitor energy to the filter 270 (FIG. 2) and output load. Since the filter 270 is inductive above the A.-C. output freqency, the turn-off capacitor resonantly discharges at high efficiency and a very rapid rate as compared to T and is illustrated in the lower graph of FIG. 3 by the slope provided in the decay of the output time ΔT beyond $t_1$. The time ΔT is exaggerated for purposes of illustration and ordinarily would be so fast as to be indistinguishable. The stored energy in the capacitor 35 is thus returned to the load and is not wasted. This is of considerable importance in achieving a high efficiency static inverter, since considerable energy is usually stored in the capacitor 35 in order to provide reliable turn-off of the silicon controlled rectifiers 10 and 30.

As will be appreciated by those skilled in the art, because of the presence of inductances in the discharging circuit of the turn-off capacitor 35, oscillations will unavoidably occur which might cause the turn-off capacitor 35 to be charged to a negative voltage. This is most undesirable and may result in unreliable operation of the inverter because such a negative voltage will prevent the turn-off capacitor 35 from being charged to its necessary high voltage in the next half cycle of operation. To overcome this problem, a semiconductor diode 40 is provided across the turn-off capacitor 35 and poled so as to prevent the turn-off capacitor 35 from ever becoming charged to a negative voltage.

After the turn-off capacitor 35 has discharged, there will be insufficient holding current through the rectifier 20 and it will turn "off" in the same manner as did the rectifier 30 through which the turn-off capacitor 35 was charged. Thus, at some short time after $t_1$ all the silicon controlled rectifiers 10, 20 and 30 which were previously turned "on" are now again in their "off" condition. The positive cycle of the A.-C. conversion is then completed. The negative half cycle operation is similar to that of the positive half cycle with the rectifiers 100, 120 and 130 operating in the same manner as the rectifiers 10, 20 and 30, respectively, and the winding portion 72 of the transformer primary winding 76 serving the same purpose as the winding portion 71.

The negative half cycle begins at a time $t_2$ sufficiently greater than $t_1$ so that all transients have died out and all rectifiers are "off." The negative half cycle is then initiated by applying firing pulses from the pulse generating circuitry 220 shown in FIG. 2 to the grid and cathode terminals G—H and I—J to simultaneously turn "on" the rectifiers 100 and 130 in the same manner as the rectifiers 10 and 30 were turned on in the positive half-cycle. These firing pulses are illustrated by the single pulse at $t_2$ in the top graph of FIG. 3. The turning "on" of the silicon controlled rectifier 100 causes the voltage of the D.-C. power supply 15 to be applied to the winding portion 78 of the transformer primary winding 76 as a result of positive current flow from the D.-C. power supply 15 through the rectifier 100 and the winding portion 77. A negative output pulse P— is thereby produced across the terminals M—N of the secondary winding 79 as illustrated in the lower graph of FIG. 3.

At the same time, the simultaneous turn-on of the rectifier 130 causes the voltage appearing between the end 76b of the transformer primary winding 76 and the center tap 70 to be applied to positively charge the turn-off capacitor 35 as a result of positive current flow through the rectifier 130 and the inductor 85 to the turn-off capacitor 35. The winding portion 72 is preferably chosen the same as the winding portion 71 so that the charging source voltage appearing between the end 76b of the transformer primary winding 76 and the tap 70 is the same as appeared between the end 76a and the tap 70 during the positive half cycle. Also resonant charging takes place during the negative half cycle since charging current flow to the turn-off capacitor 35 is through the inductor 85 which has been chosen for resonant charging. Thus the turn-off capacitor 35 charges up to substantially the same high voltage considerably in excess of the D.-C. power supply voltage as in the positive half cycle.

When charging ceases, the rectifier 130 turns "off" and the rectifier 100 continues to produce the pulse P— across M—N until, at a time $t_3$, preferably chosen so that the pulse-widths of the negative and positive pulses are substantially equal, a firing pulse is applied to the grid and cathode terminals K—L of the silicon controlled rectifier 120 as indicated by the pulse at $t_3$ in the top graph of FIG. 3. When the rectifier 120 turns "on" and becomes an effective short circuit at time $t_3$, the high positive voltage to which the turn-off capacitor 35 has been charged is placed in series opposition to the D.-C. power supply 15 as far as the rectifier 100 is concerned, thereby turning it "off" in the same way as the rectifier 10 was turned "off" during the positive half-cycle. The energy on the turn-off capacitor 35 then discharges through the inductor 55, the silicon controlled rectifier 120 and the winding portion 72 of the primary winding 76a as during the positive half-cycle so that its energy is again fed to the load instead of being wasted. This discharge of the turn-off capacitor is illustrated by the exaggerated decay of the negative half-pulse during the time ΔT after $t_3$ as shown in the lower graph of FIG 3.

The diode 40 again acts to prevent the turn-off capacitor 35 from charging to a negative voltage, and when the capacitor 35 has finished discharging, the rectifier 120 turns "off" so that all the rectifiers 100, 120 and 130 which were previously turned "on" are again "off." The positive cycle can then be repeated by applying firing pulses to the grid and cathode terminals A—B and C—D of the rectifiers 10 and 30, respectively, as shown at the time $t_4$ in the lower graph of FIG. 3, which is preferably chosen so that $t_2-t_0=t_4-t_2$. The frequency $f_0$ of the resultant A.-C. wave obtained across the terminals M—N of the output winding 79 of the transformer 75 is the reciprocal of the total period $t_4-t_0$ as shown in the graphs of FIG. 3.

It will be realized that the width T of the pulses P+ and P— determines the power output obtained from the static inverter. Thus, regulation may be achieved by controlling the width of T by means of conventional low power feedback circuitry such as indicated by 290 in FIG. 2. Those skilled in the art will understand that the feedback circuitry 290 may readily be adapted to cooperate with the output of the filter 270 and the adjustment means 225 for regulation and/or adjustment purposes.

If desired, the semiconductor diodes 11 and 110 which are shown connected in parallel across the rectifiers 10 and 100, respectively, through the inductor 95 may be employed for protective purposes. When the rectifier 20 or 120 is turned "on," a high reverse cut-off voltage appears across the rectifiers 10 or 100, depending upon the particular half cycle. The diodes 11 and 110 prevent this high reverse voltage from being present for too great a time which might damage the rectifiers or shorten their life. The value of the inductor 95 is made sufficiently large so that the reverse voltage is present long enough to provide reliable turn-off, but not long enough to damage the rectifiers. It will be evident that the diodes 11 and 110 will also provide protection from transients or energy feedback from the filter 270 (FIG. 2) which might occur during no load or widely varying load conditions. The protection provided by these diodes 11 and 110 in this simple manner is of considerable importance from the viewpoint of reliability and long life, since reverse cut-off voltages and/or the sudden disappearance of load has often wrecked other types of static inverters which did not provide such protection, or at the very least greatly reduced their operating life.

In summary, it will be seen that the invention provides a number of important features, any one of which is of considerable significance. These are: (1) the provision of the additional portions 71 and 72 of the primary winding 76 combined with resonant charging provided by proper choice of the inductor 85 and the turn-off capacitor 35 to permit the voltage across the capacitor 35 to be conveniently and efficiently charged to a much higher voltage than that of the D.-C. power supply 15 so as to insure reliable turn-off of the rectifier 10 or 100 when the respective silicon rectifiers 20 or 120 are turned on; (2) the provision of the rectifiers 20 and 120 not only to provide a path for turn-off of their associated rectifiers 10 and 100 during their respective half cycles but also, to permit the energy which is stored in the capacitor 35 to be fed to the filter and load instead of being wasted, thereby maintaining a high efficiency; (3) the provision of a diode 40 across the turn-off capacitor 35 to prevent the capacitor 35 from being charged to a negative voltage which might cause unreliable operation; (4) the provision of the protective diodes 11 and 110 which provide reverse voltage protection and reliable operation over widely varying or no load conditions; and (5) the advantage that low power feedback circuitry 290 can conveniently be provided for regulation purposes.

The firing pulses illustrated in the top graph of FIG. 3 which are used to fire the various silicon controlled rectifiers in the circuit of FIG. 1 may suitably be provided by the pulse generating circuitry 220 shown in block form in FIG. 2 in any of a number of well known ways which will readily occur to those skilled in the art. The pulses may be of any suitable width, such as 10–20 microseconds and their amplitude is not critical as long as they supply a current in excess of the critical firing current of the silicon controlled rectifiers.

Specific values which might be provided for the circuit of FIG. 1 are now presented below. It is to be understood that these values are presented merely for illustrative purposes and are not to be considered as limiting the present invention in any way.

Silicon controlled rectifiers 10,
   20, 30, 100, 120 and 130____ GE-C35.
Semiconductor diodes 11, 110
   and 40_____ IN2156.
Turn-off capacitor 35_____ 5 microfarads, 400 volts.
Inductor 55_____ 5 microhenrys.
Inductor 85_____ 100 microhenrys.
Inductor 45_____ 40 microhenrys.
$\dfrac{\text{Turns of winding portion 71 or 72}}{\text{Turns of primary winding 76}} = \dfrac{1}{6}$.
D.-C. power supply 15_____ 22 to 30 volts.
T_____ 100–1,000 microseconds.
$f_0$_____ 400 cycles/sec.

A specific circuit having the above values is capable of providing a reliable and long life static inverter having an efficiency as high as 85%, which can withstand severe operating conditions, such as a widely varying load or even no load.

It is to be understood in connection with the present invention that the embodiment described herein is only exemplary and various modifications in construction and arrangement are possible without departing from the spirit of this invention. For example, it is sometimes found desirable to provide a reset winding for the transformer 75 in addition to the other windings so as to permit the winding core to be placed on the proper point of its hysteresis loop. Also, it will be appreciated that in order to increase the power or voltage handling capabilities of the static inverter a number of silicon controlled rectifiers may be placed in parallel or series instead of the single one of each shown in FIG. 1.

It will also be realized that the invention is not limited to the use of silicon controlled rectifiers, although they seem most advantageous at present, and other controlled rectifier or switching devices may also be employed, as well as superior types which may become available in the future. The use of the term "controlled rectifier" in the specification and claims is intended to include both the silicon controlled rectifiers exemplified herein and other three-element switching devices which may be employed in accordance with the invention, or any numbers of such in parallel or series.

The above modifications and variations are not exhaustive and further modifications will occur to those skilled in the art. The present invention, therefore, is to be considered as including all modifications in construction and arrangement coming within the scope of the invention as defined in the appended claims.

We claim as our invention:

1. A static inverter for converting direct-current power to alternating-current power comprising in combination: a D.-C. power supply, an output circuit including a transformer, means including a first controlled rectifier for applying one polarity of the voltage of said D.-C. power supply to said output circuit in response to the receipt of a firing signal at a first predetermined time in each cycle of operation, a turn-off capacitor, means including a second controlled rectifier for charging said turn-off capacitor to a turn-off voltage substantially in excess of the voltage of said D.-C. power supply in response to the receipt of a firing signal substantially at said first predetermined time, means including a third controlled rectifier cooperating with said turn-off capacitor for applying the voltage to which said turn-off capacitor is charged to turn "off" said first rectifier in response to the receipt of a firing signal at a second predetermined time in said cycle after said first predetermined time, said last mentioned means also cooperating with said output circuit to discharge the voltage on said turn-off capacitor into said load circuit, means including a fourth controlled rectifier for applying the voltage of said D.-C. power supply to said output circuit in the opposite polarity in response to the receipt of a firing signal at a third predetermined time in said cycle after said first predetermined time, means including a fifth controlled rectifier for charging said turn-off capacitor to a turn-off voltage substantially in excess of the voltage of said D.-C. power supply in response to the receipt of a firing signal substantially at said third predetermined time, means including a sixth controlled rectifier cooperating with said turn-off capacitor for applying the voltage to which said turn-off capacitor is charged to turn "off" said fourth rectifier in response to the receipt of a firing signal at a fourth predetermined time in said cycle after said third predetermined time, said last mentioned means also cooperating with said output circuit to discharge the voltage on said turn-off capacitor into said load circuit, and means for applying said firing signals to said rectifiers at said predetermined time so that said cycle of operation repeats periodically at a predetermined rate.

2. The invention in accordance with claim 1, there being additionally provided: a diode connected in parallel with said turn-off capacitor and poled so as to prevent said turn-off capacitor from being charged to a voltage opposite in direction to said turn-off voltage.

3. A static inverter for converting D.-C. power to A.-C. power comprising in combination the following elements: a D.-C. power supply, an output transformer having at least primary and secondary windings, said primary winding having a center tap coupled to one side of said power supply, first and second similarly-poled controlled rectifiers respectively coupled between the other side of said power supply and opposite sides of said primary winding, a turn-off capacitor having one end coupled to said center tap, third and fourth similarly-poled controlled rectifiers respectively coupled between opposite sides of said primary winding and the other end of said turn-off capacitor, a resonant inductance means interposed between said third and fourth rectifiers and said turn-off capacitor, fifth and sixth similarly-poled rectifiers respectively coupled between opposite sides of said transformer and said turn-off capacitor and poled opposite to said third and fourth rectifiers with respect to said turn-off capacitor, and a pulse generating means adapted to periodically apply firing signals to said rectifiers in a predetermined time relationship, said elements being constructed and arranged so that said first and second rectifiers alternately apply said D.-C. power supply across opposite sides of said primary winding, said turn-off capacitor is resonantly charged through one of said third and fourth rectifiers to a turn-off voltage substantially in excess of the voltage of said D.-C. power supply each time said D.-C. power supply is applied across one side of said primary winding, said first and second rectifiers are turned "off" a predetermined time after being fired by said turn-off capacitor acting through one of said third and fourth rectifiers, and said turn-off capacitor is discharged through a path including a portion of said primary winding as a result of discharge current flow through one of said fifth and sixth rectifiers.

4. A static inverter for converting D.-C. power into A.-C. power comprising in combination the following elements: a D.-C. power supply, an output transformer having at least primary and secondary windings, said primary winding having a center tap and substantially equally disposed first and second taps on opposite sides thereof, said center tap being coupled to one side of said power supply, first and second similarly-poled controlled rectifiers respectively coupled between the other side of said power supply and said first and second taps, a turn-off capacitor having one end coupled to said center tap, third and fourth similarly-poled controlled rectifiers respectively coupled between opposite ends of said primary winding and the other end of said turn-off capacitor, a resonant inductance means interposed between said third and fourth rectifiers and said turn-off capacitor, fifth and sixth similarly-poled rectifiers respectively coupled between said first and second taps and said turn-off capacitor and poled opposite to said third and fourth rectifiers with respect to said turn-off capacitor, and a pulse generating means adapted to periodically apply firing signals to said rectifiers in a predetermined time relationship, said elements being constructed and arranged so that said first and second rectifiers alternately apply said D.-C. power supply across opposite sides of said primary winding, said turn-off capacitor is resonantly charged through one of said third and fourth rectifiers to a turn-off voltage substantially in excess of the voltage of said D.-C. power supply each time said D.-C. power supply is applied across one side of said primary winding, said first and second rectifiers are turned "off" a predetermined time after being fired by said turn-off capacitor acting through one of said third and fourth rectifiers, and said turn-off capacitor is discharged through a path including a portion of said primary winding as a result of discharge current flow through one of said fifth and sixth rectifiers.

5. The invention in accordance with claim 4, there being additionally provided: a diode connected in parallel with said turn-off capacitor and poled so as to prevent said turn-off capacitor from being charged to a voltage opposite in direction to said turn-off voltage.

6. The invention in accordance with claim 5, there being additionally provided: first and second protective diodes and an inductance connected so that said diodes are in parallel with said first and second rectifiers through said inductance, said diodes being poled in a direction opposite to the polarity of said first and second rectifiers, said inductance being chosen small enough to prevent reverse voltages from damaging said first and second rectifiers and large enough to permit turn-off thereof.

7. The invention in accordance with claim 4, said rectifiers being silicon controlled rectifiers.

References Cited in the file of this patent

UNITED STATES PATENTS

| | | |
|---|---|---|
| 2,691,755 | Zirker | Oct. 12, 1954 |
| 2,872,635 | Lawn | Feb. 3, 1959 |
| 3,010,062 | Van Emden | Nov. 21, 1961 |
| 3,047,789 | Lowry | July 31, 1962 |

OTHER REFERENCES

General Electric Controlled Rectifier Manual; first edition; copyright March 21, 1960, by General Electric.